(12) United States Patent
Miller

(10) Patent No.: US 8,505,818 B2
(45) Date of Patent: Aug. 13, 2013

(54) SINGLE CLICK FIRE CONTROL AND VISUALIZATION FOR SMALL UNIT OPERATIONS

(75) Inventor: Darius F. Miller, San Diego, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/282,998

(22) Filed: Oct. 27, 2011

(65) Prior Publication Data

US 2013/0105579 A1    May 2, 2013

(51) Int. Cl.
*G06F 19/00*    (2011.01)
*G06G 7/80*    (2006.01)
*B64D 1/04*    (2006.01)
*F41F 5/00*    (2006.01)
*F41A 33/00*    (2006.01)

(52) U.S. Cl.
USPC .................. 235/400; 89/1.1; 89/1.11; 434/11

(58) Field of Classification Search
USPC .............................. 235/400; 434/11; 89/1.11
See application file for complete search history.

(56) References Cited

U.S. PATENT DOCUMENTS

| | | | |
|---|---|---|---|
| 5,822,713 A * | 10/1998 | Profeta | ........................ 701/302 |
| 6,952,001 B2 | 10/2005 | McKendree et al. | |
| 7,275,691 B1 | 10/2007 | Wright et al. | |
| 7,519,569 B1 | 4/2009 | Flynn et al. | |
| 7,698,983 B1 | 4/2010 | Pinto et al. | |
| 2004/0007121 A1 | 1/2004 | Graves et al. | |
| 2005/0090201 A1 | 4/2005 | Lengies et al. | |
| 2007/0277111 A1 | 11/2007 | Bennett et al. | |
| 2009/0282719 A1 * | 11/2009 | O'Dwyer | ..................... 42/76.01 |
| 2012/0214137 A1 * | 8/2012 | Goree et al. | ................... 434/19 |

OTHER PUBLICATIONS

Frozen Synapse, Jun. 3, 2011, Mode 7 Games, retrieved on Nov. 2, 2012 from the Internet: <http://web.archive.org/web/20110603170730/http://www.frozensynapse.com>.*

Naeem et al., A Two-Stage Dynamic Decision Support based Optimal Threat Evaluation and Defensive Resource Scheduling Algorithm for Multi Air-borne threats: Asset-based Dynamic Weapon Scheduling using Artificial Intelligence Techinques, 2010, IEEE, 2010 IEEE 9th International Conference on Cybernetic Intelligent Systems (CIS).*

Icebrain, Frozen Synapse Official Manual, Jun. 11, 2011, retreived on Oct. 24, 2012 from the Internet: <http://icebrain.net/guides/official-manual/frozensynapse-official-manual.pdf>.*

European Search Report mailed Feb. 19, 2013; Application Serial No. 12007153.5-1811 in the name of Harris Corporation.

* cited by examiner

*Primary Examiner* — Thien M Le
*Assistant Examiner* — Toan Ly
(74) *Attorney, Agent, or Firm* — Fox Rothschild, LLP; Robert J. Sacco

(57) ABSTRACT

A method for providing fire support command and control for small unit operations. The method involves displaying a geographical representation of a battle space using a map. One or more strike asset icons are displayed on the map, each representing strike assets which are geographically dispersed within the battle space. At least one target icon is also displayed on the map to represent a target within the battle space. In response to a user input identifying a desired effect upon the target, the system graphically conveys fire mission planning information to the user during an interactive mission planning process.

23 Claims, 16 Drawing Sheets

Target in the planned state.

Target in "In Progress" state.

Fire support unit.

User selection that forms part of the solution.

System recommended unit from automated WTP

Asset conflicted, user has over-ridden.

Asset denies mission or CANTO (can't comply).

Available asset though not recommended.

Available asset though has a conflict.

Unavailable asset.

FIG. 11B — Direct fire with LOS

FIG. 11C — Indirect fire and capable

FIG. 11D — Direct fire without computed LOS

FIG. 11E — Direct double basic shot

FIG. 11F — Direct triple basic shot

FIG. 11G — Indirect double basic shot

FIG. 11H — Indirect triple basic shot

Adjusting round

At my command

When ready, or fire for effect

Check fire

Handoff, and you are recipient

Handoff to higher echelon (i.e. call for fire)

Mission sent to fire support unit at my command

Mission sent to fire support FFE

Fire support unit ready and waiting on command

Munitions released, moving dots indicate where the munitions are

Asset denies mission or cannot comply/operate

Target destroyed and met mission requirements

Target neutralized and met mission requirements

Target suppressed and met mission requirements

Did not meet mission requirements

Did not meet mission requirements

Did not meet mission requirements

Partially met mission requirements

SINGLE CLICK FIRE CONTROL AND VISUALIZATION FOR SMALL UNIT OPERATIONS

BACKGROUND OF THE INVENTION

1. Statement of the Technical Field

The inventive arrangements relate to fire control systems, and more particularly to fire control systems which are suitable for small unit operations.

2. Description of the Related Art

Fire support refers to weapons fire used to engage enemy forces and facilities. Fire support coordination is the planning and executing of weapons fire (fires) using a suitable weapon or group of weapons. Effective fire support ensures that a suitable attack means is delivered on the correct target at the desired time. Fire support planning and coordination in the ground combat area is a very complex task involving continuous analysis enemy and friendly forces positions; identifying targets; identifying and assigning fire support assets; scheduling delivery of munitions.

Fire support planning and coordination is generally the responsibility of a fire support coordination center (FSCC). The FSCC is a centralized communications facility and its associated personnel who coordinate various forms of fire support. From an organizational standpoint, an FSCC usually exists in military units at one or more relatively high organizational levels. For example, an FSCC can be provided for each of a division, brigade, and battalion level. An FSCC is not generally established at the company level. The company commander is responsible for his fires and organizes his personnel accordingly. The lowest level FSCC that has the ability to handle a particular mission will generally provide the necessary fire support.

Within each FSCC, there is a fire support coordinator (FSC) who is responsible to manage the activities of the FSCC. The FSC makes decisions regarding assets needed for covering various targets, and requests additional support from higher level echelons if his assets are inadequate. When evaluating requests from lower echelons for fires, the FSC considers the type and significance of the target, the available time to engage the target, which assets are available for proceeding with the attack, the objectives that are to be achieved with respect to the particular target, and the minimum number/type of assets to carry out the attack. The FSC must also consider whether an attack upon a particular target will present a risk of fratricide, and may take appropriate steps to minimize risk to friendly units. Another consideration for the FSC is the allocation and availability of ammunition within a strike asset. In those instances where one strike asset lacks sufficient ammunition to engage a target, it may be desirable to make use of alternative units. Once these issues have been resolved, the FSC will communicate the request for fire support to the appropriate supporting unit (artillery units, mortar units, naval or air support) that can safely and effectively deliver the needed fires.

A substantial portion of the coordination tasks required to execute a fire support plan are accomplished at the battalion level. Battalion FSCCs monitor/receive calls for fire and air requests from the companies that they supervise. These tasks are normally performed by the appropriate supporting unit representatives (e.g., artillery, air operations, or mortar representative). Supporting unit representatives assist the FSC in performing the tasks required to coordinate and clear fire support missions.

SUMMARY OF THE INVENTION

The invention concerns a computer system and method for providing fire support command and control for small unit operations. The method involves displaying a geographical representation of a battle space using a map. One or more strike asset icons are displayed on the map, each representing strike assets which are geographically dispersed within the battle space. At least one target icon is also displayed on the map to represent a target within the battle space.

In response to a user input identifying a desired effect upon the target, the system graphically conveys fire mission planning information to the user during an interactive mission planning process. It conveys this information by selectively displaying one or more graphic elements, each having a predetermined meaning, in combination with a target icon. It can also convey this information by displaying one or more graphic elements, each having a predefined meaning, in combination with at least one strike asset icon. The method can also include conveying mission planning information to the user during the mission planning process by selectively displaying one of a plurality of line styles for an association line extending between a target icon and the strike asset icon. The method further involves automatically determining if a proposed fire solution will result in any conflicts or errors. In response to a user command, mission data for implementing a fire mission is automatically communicated to the assigned strike assets.

Subsequent to the communicating step, a status of at least one strike asset is conveyed to the user by selectively displaying one or more graphic elements, each having a predetermined meaning, in combination with the strike asset icon. The method can also include graphically conveying a battle damage assessment to the user during or after the fire mission by selectively displaying one or more graphic elements, each having a predetermined meaning, in combination with the target icon.

BRIEF DESCRIPTION OF THE DRAWINGS

Embodiments will be described with reference to the following drawing figures, in which like numerals represent like items throughout the figures, and in which:

FIG. 11A-11H show association lines used during a fire control planning stage and having various different styles to indicate different strike asset associations.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Conventional fire support coordination and control methods are complicated and cumbersome. Advanced training is required for fire support coordinators (FSCs) and fire support personnel at the division, brigade and battalion level to support these conventional systems. The methods make use of multiple spreadsheets, forms, and checklists, for purposes of responding to requests for fires from personnel at the company level and below; even so, these systems are prone to errors. Consequently, these methods are not suitable for use by small military units (e.g. company level and below). Instead, such small units must rely on fire support coordination centers (FSCCs) at higher levels, such as at the battalion or brigade level.

The present invention concerns methods and systems which bring the fire support coordination and control process to the small unit level. The inventive arrangements provide a simple, integrated user interface that provides full fires functionality without the complexity of conventional fire support coordination systems. The integrated user interface provides small units with greater visibility and clarity of the fire mission data, on-map visualization of targets, recommended fire support assets for various targets, identifies mission conflicts, and provides real time status of involved entities. With a simple point and click interface, users can approve fire missions, check fire, repeat missions, and end missions. The system offers small units automatic weapon pairing, auto-validation of logistics, command clearances, de-confliction, and range to target information. Automatic checks and feedback systems result in user-defined fire missions that avoid the usual communications with FSCCs, and rapid access to battle damage assessments (BDA).

Figure 1:
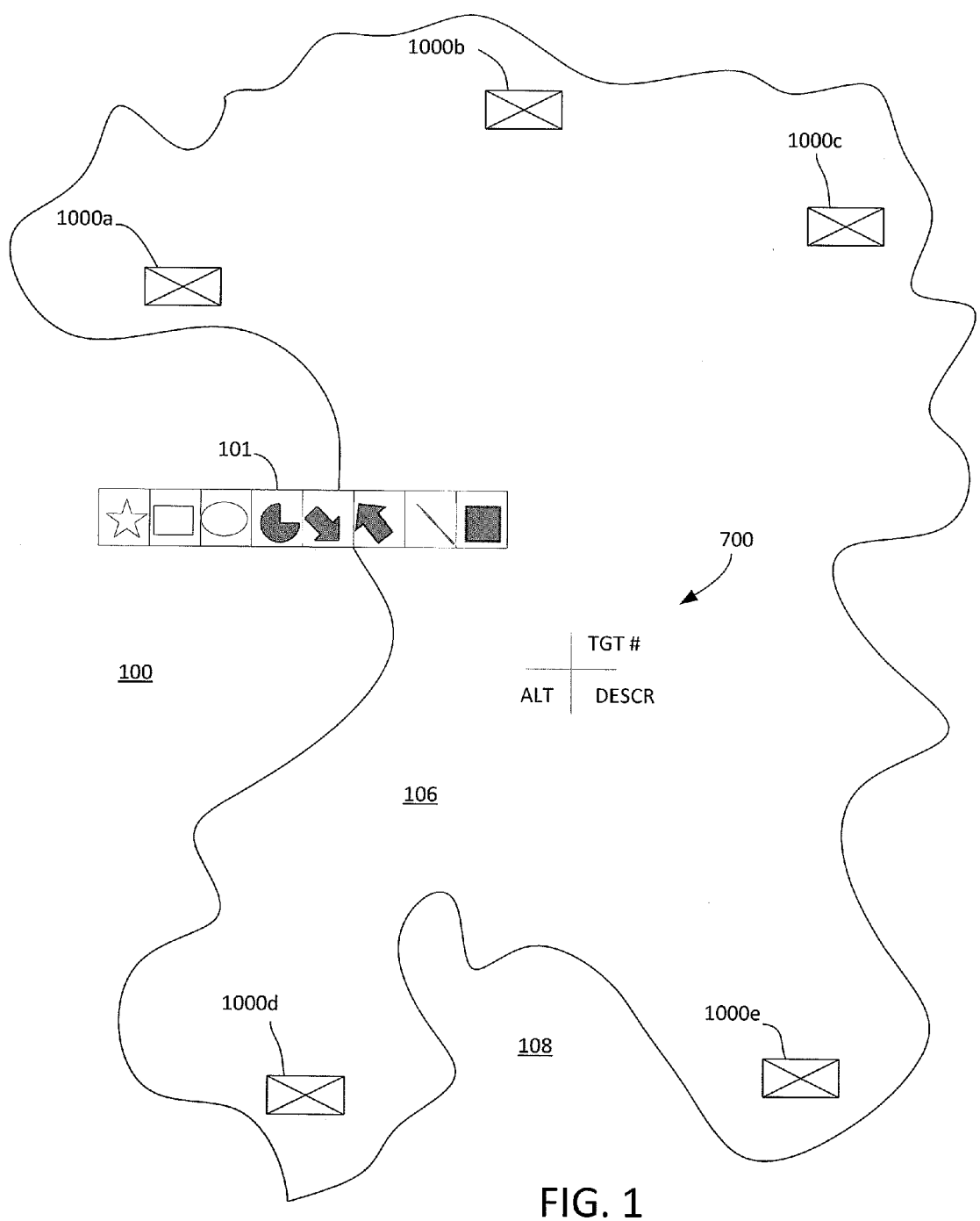
FIG. 1 is a drawing which shows a computer generated graphical display of a battle space which includes target icons and strike asset icons.

Referring now to FIG. 1 there is provided a drawing which shows the content of a computer generated image or display that is presented to a user. The displayed image is a geographical representation of a battle space in the form of a map 100. The computer system used to generate the display is described below in further detail. As is well known in the art, a computer generated map display can include various details relating to the subject of a particular geographical area including land mass areas 106, water features 108, terrain, roads, topography, vegetation and so on. For greater clarity, some of these various details are omitted from the image 100 in FIG. 1 and in similar figures throughout this specification.

Displayed on the map 100 are one or more computer generated target symbols or icons 700 which represent one or more targets within the battle space. Fire missions can be directed against the targets using one or more geographically dispersed strike assets. The strike assets are represented on the map 100 as strike asset icons 1000. For simplicity in distinguishing the various fire support icons, they are identified as 1000a-1000e. A tool bar 101 can be provided for fast and convenient selection of computer-based functions that allow fire missions to be planned, controlled, executed and evaluated according to the various embodiments of the present invention.

The functions of tool bar 101 and various other functions of the fire control system are described in greater detail below, however these functions are preferably accessed with simple point and click commands. As used herein, point and click means the positioning of a cursor over a computer icon, and signaling the computer system by suitable means, such as a control switch. For example, users can input such commands to the computer system by well known means such as a computer mouse, touch pad, keyboard or any other type pointing device. Still, the invention is not limited in this regard and any other suitable method can be used to access the functions of the system. The functions of the tool bar can be context sensitive so that the options available to the user will vary in accordance with the fire control planning and execution process.

The targeting process can begin with the user clicking on a "target" button on the tool bar 101, and can then click a location on the map. The "target" button can be identified by text or preferably by an icon. When the user clicks on the map, the system response can vary depending on the location that is clicked. If the click spot is a target icon, the system will create a new mission for the existing target. If the click spot is an enemy unit, the system will create a new target and mission based on the characteristics of the selected object with regard to target type and size. If the click spot is neither of the above, a new target will be created within the system, but will not create an associated mission.

Figure 2:
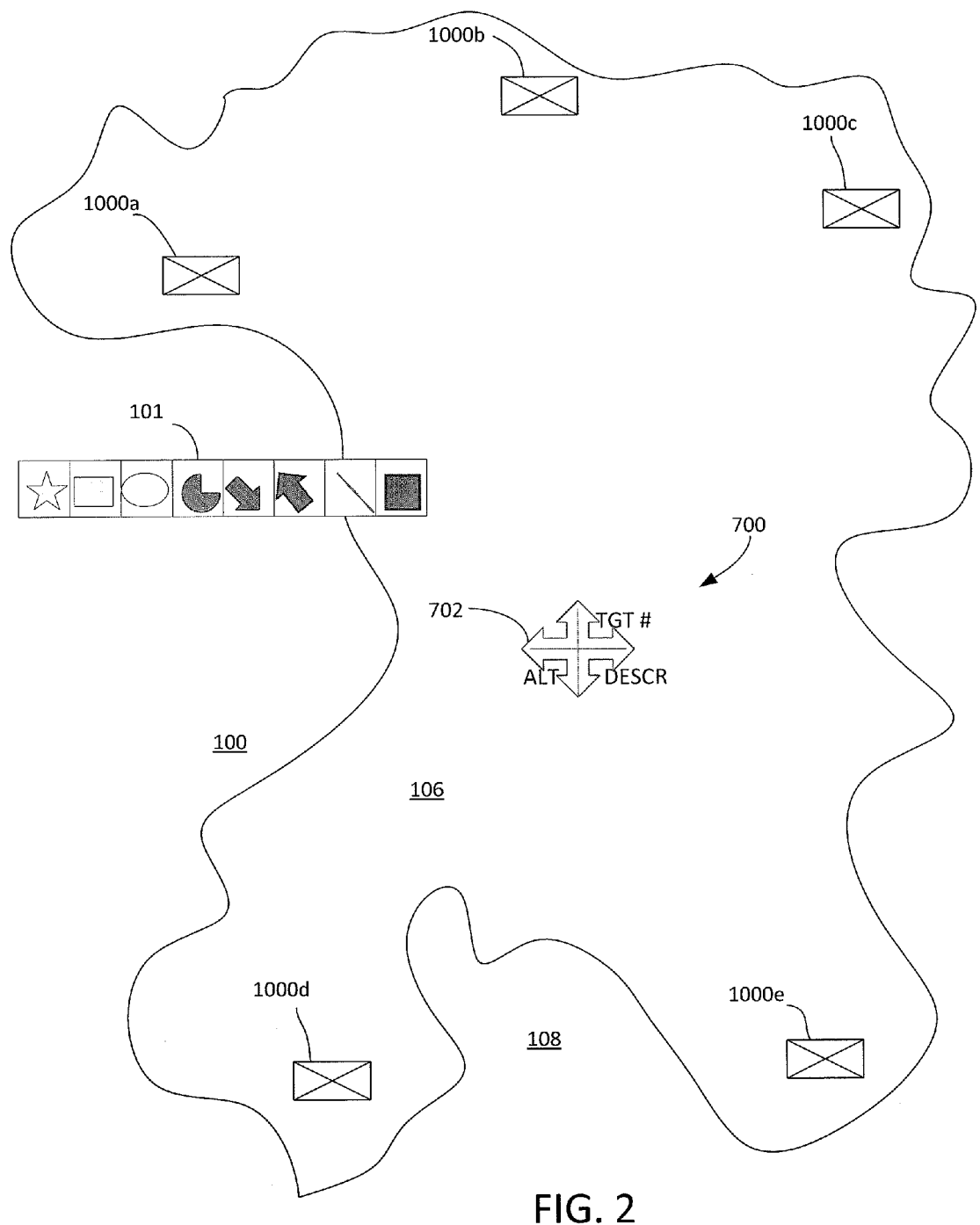
FIG. 2 shows the graphical display of FIG. 1 in which a target has been selected for some action.

Referring now to FIG. 2, a target 700 can be selected for a fire mission by a point and click method. Specifically, a user can position a cursor (not shown) over a particular map location (e.g. target icon 700) and select the target icon by means of a user input signal, such as activation of a control switch. Once selected, the appearance of the target icon is modified or highlighted. For example, in FIG. 2, the target icon 700 is shown to be modified by displaying a graphic element 702 with the target icon. Once the target has been selected, all subsequent fire related operations are directed to that particular target. When a target is selected, the system will enable context sensitive toolbar 101 with a suitable set of actions in a fires button toolbar. If a target has been previously selected that causes any form of state changes, the process will return to the exact state it was in prior to losing selection.

Figure 3:
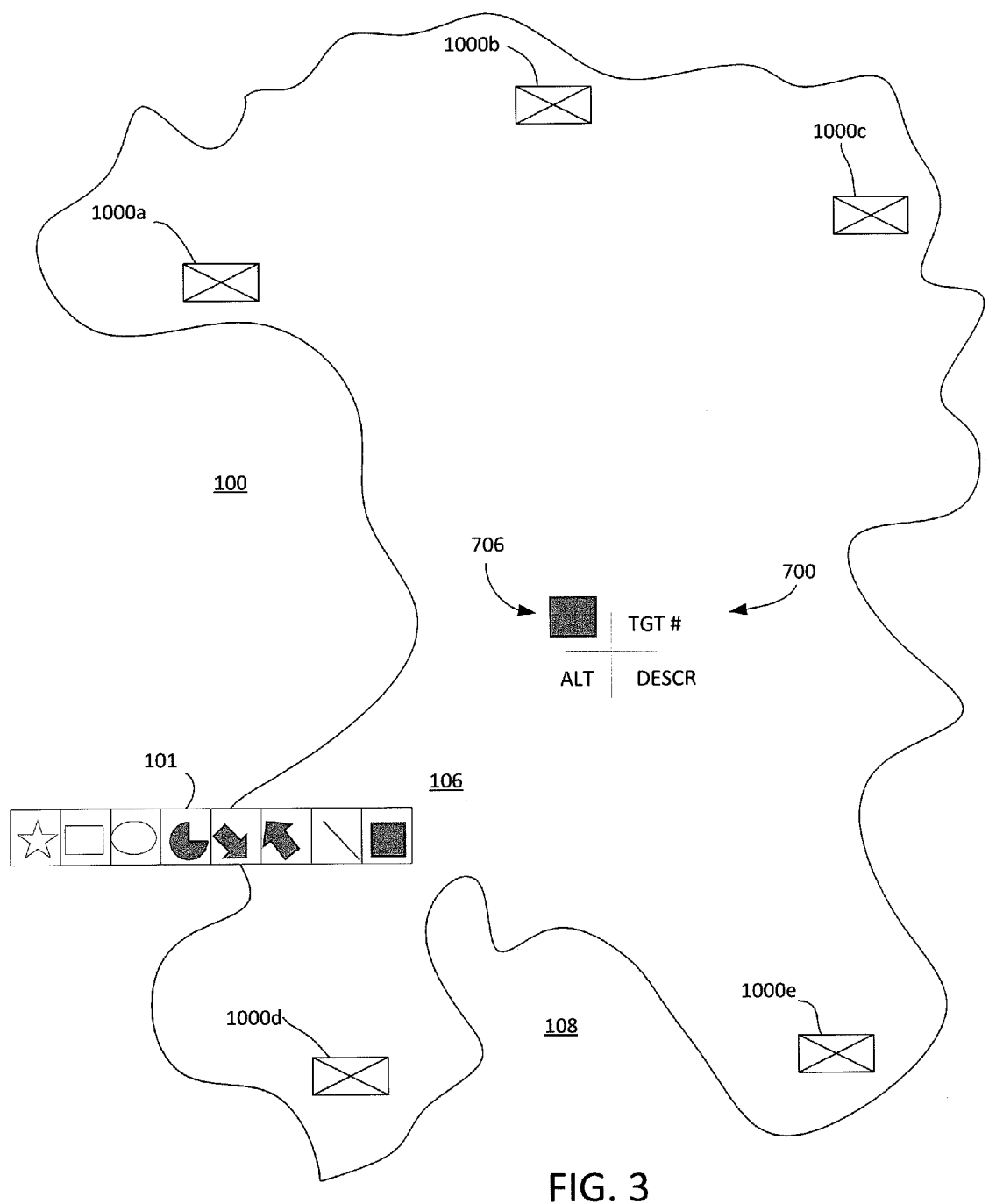
FIG. 3 shows the graphical display of FIG. 2 in which a desired effect has been assigned to a target.
Figure 8:
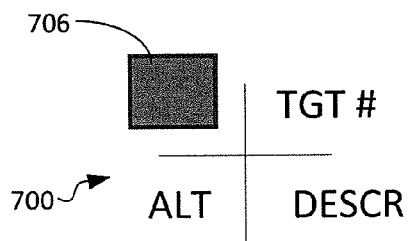
FIG. 8 shows alternative graphical elements displayed with a target icon to represent different desired effects.
Figure 8:
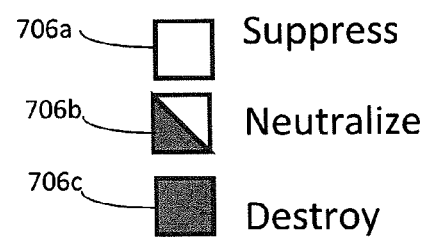

Once the target is selected, the user can initiate a user input to specify a desired effect upon the target. For example, the user may specify that the selected target be suppressed, neutralized, or destroyed. Each selection will automatically replace any previous selection. Once the desired effect is specified, the appearance of the target icon 700 is preferably modified as shown in FIG. 3 to include a graphic element 706. Various different graphic elements can be provided to identify different types of desired effects. For example, various desired effects can be indicated using the graphic elements shown in FIG. 8. The graphic element 706a indicates that the target element is to be suppressed; graphic element 706b indicates that the target element is to be neutralized, and graphic element 706c indicates that the target element is to be destroyed. In FIG. 3, the selected graphic element 706 indicates that the desired effect is to destroy the target.

Figure 4:
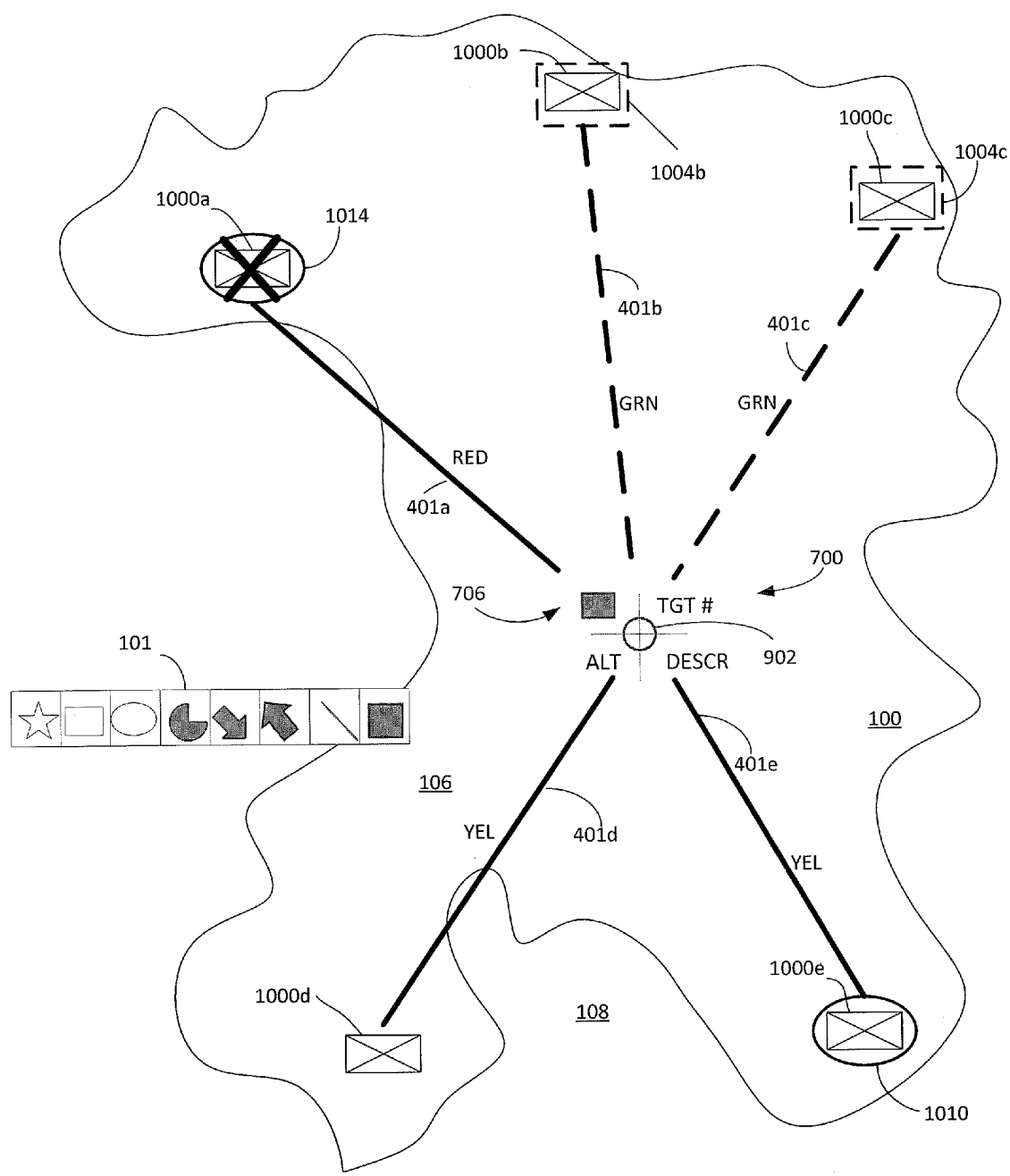
FIG. 4 show the graphical display of FIG. 3 in which strike asset recommendations are presented to a user.

Once a target has been selected and the desired effect specified, a user can initiate a weapon target pairing (WTP) state. This state can be accessed by a suitable button provided in the toolbar 101. In general, a target must be selected to enable the WTP button in the toolbar. When the WTP state is selected, the appearance of the display can be modified. FIG. 4 shows one example of how map 100 could appear as the user is working with the system in the WPT state. The system will visually identify which strike assets that are capable or not capable of operation by adding an appropriate graphic element to a particular strike asset icon. For example, visual indications of strike assets that are not available can be provided by using one or more of the graphic elements shown in FIG. 10E-10H. In the example shown in FIG. 4, the icons associated with strike asset 1000a and 1000e have been modified with graphic elements 1010 and 1014 to indicate that these strike assets are not available. The meanings of the various other graphic elements used with strike asset icons are shown in FIGS. 10A-10H.

In the WTP state, association lines 401a-401d can also be added to the map to provide additional information that is useful for mission planning. The available association lines and their meanings are shown in FIGS. 11A-11H. In the example shown in FIG. 4, the solid lines (401a, 401d, 401e) indicate that a strike asset weapon is direct fire, line of sight (LOS), whereas the broken lines (401b, 401c) indicate that a strike asset weapon is indirect fire (non LOS) and capable of firing. Various other association lines can be used as shown in FIGS. 11B-11H.

In the WTP state, a user can select a plurality of strike assets which are to be used against a selected target by clicking on the selected strike assets. If a strike asset has been previously selected and the user clicks on the asset, the association will be removed, and the displayed visualization of the strike asset will revert to what was previously calculated with regard to strike asset capability and usability. Alternatively, the user can select an Auto WTP button which enables the system to automatically evaluate the information it has concerning the type and size of the selected target. Based on this stored information, the system automatically recommends pairings of strike assets. In FIG. 4, strike assets 1000b, 1000c are modified with graphical elements 1004b, 1004c to indicate that they are system recommended based on an Auto WTP function. Once the Auto WTP function is complete, the user will be able to edit all existing pairings and assignments of strike assets by either selecting the particular strike asset icon or the association line (discussed below).

While in the WTP state, the system will modify the appearance of the target icon to visually indicate the ratio of assigned effects (based on strike units selected) versus desired effects. In the example shown in FIG. 4, target icon 700 is modified with the addition of a graphic element 902. Graphic element 902 can be an outline of a circle or pie graphic to indicate that the target pairing process has been started, but no assets have yet been assigned. As depicted in FIG. 9C the pie chart graphic in the center of the target icon can change to represent the percentage of strike asset assignment versus the desired effect. For example, graphic 904 shows that the percentage of strike asset assignment is approximately 75%. When enough strike assets have been associated with the particular target to achieve the desired effect, graphic 906 can be used to indicate the strike asset assignment is 100%.

The user can select any association between a target and a strike asset. For example, these associations can include one basic shot, two basic shots, or three basic shots from the selected strike unit. With each selection, the system automatically recalculates and displays the ratio of selected effects versus desired effects. The system can also display the number of munitions by changing the appearance of the association line, and/or by displaying the number of munitions selected at the strike asset end of the association line. Various association lines that can be used for this purpose are shown in FIGS. 11B-11C and 11E-11H. If the user selects a number of basic shots which will result in exceeding the desired effect, a suitable visual indication can be provided. For example, the number of rounds can be displayed in an different scheme, indicating that the number of shots or rounds can be reduced.

Additional information can be graphically communicated to the user by color coding the association lines and graphical elements added to the strike assets. For example, the condition of strike asset 1000a is such that it cannot fire, so the association line 401a and graphical element 1014 can be displayed in the color red. The strike assets 1000b and 1000c can be system recommended strike assets for the specified mission in accordance with an Auto WTP process, so the association line 401b, 401c and graphical elements 1004b, 1004c can be displayed in green. Finally, the strike assets 1000d, 1000e can be "not recommended" by the computer system, and so their association lines 401d, 401e and graphic elements 1002, 1010 can be displayed in yellow.

Figure 5:
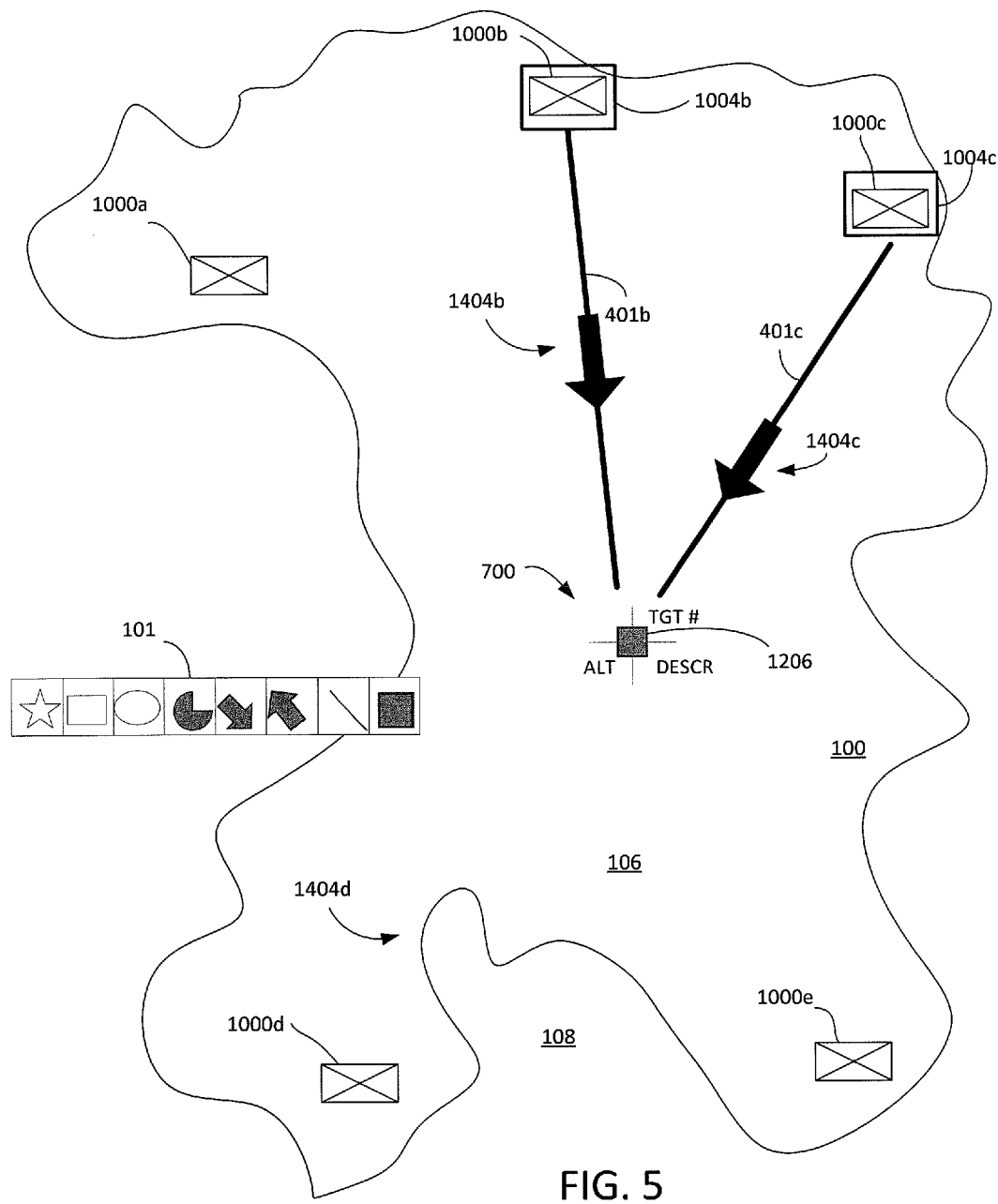
FIG. 5 shows the graphical display of FIG. 4 in which a target has been assigned sufficient strike asset assets to meet the desired effect.

A user has the option of selecting various types of control methods and assigning this control method to the strike asset. For example, these control methods can include directions to fire an adjusting round, fire at the user's command, fire for effect, and to fire when ready. Each of the various control options can be made available to the user through the toolbar 101. This operation can performed at any time during the weapon target pairing phase, which terminates when the mission is "sent" to the strike assets. Various graphic elements 1202, 1204, 1206, 1208, 1402, 1404 that can be used for control (and their associated meaning) are illustrated in FIGS. 12A-12D and FIGS. 14A-14B respectively. Once the mission is sent, it cannot be changed. The particular control method selected by the user can be indicated with one or more graphic element that can be displayed on the association line, on the target, or elsewhere. Various graphic elements 1202, 1204, 1206, 1208, 1402, 1404 that can be used for control (and their associated meaning) are illustrated in FIGS. 12A-12D and FIGS. 14A-14B respectively. In FIG. 5, the graphic elements 1206, 1404b, 1404c, indicate that the mission has been sent to the respective strike assets, and that they have been ordered to fire for effect. Of course other command conditions can also exist and be illustrated in a similar manner without limitation.

Figure 12A:
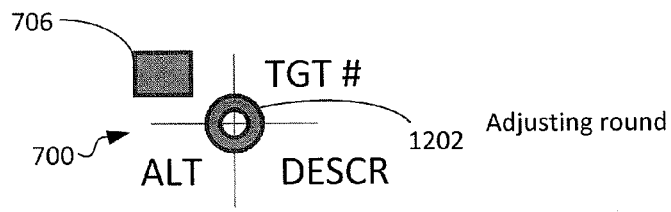
FIG. 12A-12F show various alternative graphical elements which can be displayed in conjunction with a target icon to indicate specific fire control commands communicated to a strike asset.
Figure 12B:
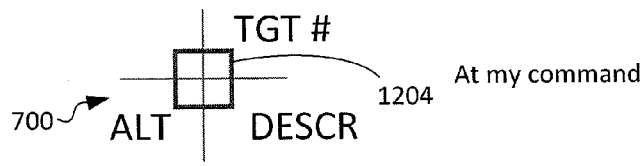
Figure 12C:
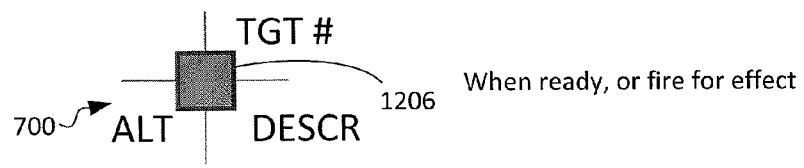
Figure 12D:
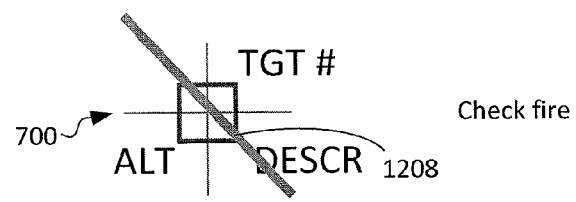
Figure 12E:
Figure 12F:
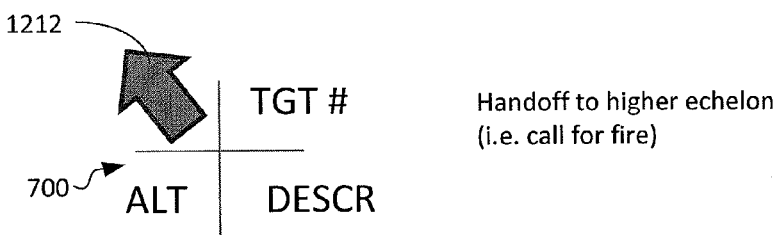

At any time prior to mission being sent to the strike assets, the target can be handed off to a higher level command by pressing a "call for fire" button on the toolbar 101. When this occurs, the target icon can be modified as shown in FIG. 12F. Alternatively, the target can be assigned to another unit by selecting the unit from the map, and pressing the "target handoff" button. If a user has been assigned a target by another unit, then the target icon 700 on his map will be modified as illustrated in FIG. 12E.

When all mission planning is completed, the user can select the "send mission" button from the toolbar 101. This action causes the system to transmit the assignment and shot count to the designated strike assets. If there are any strike assets which are part of the fire solution that are in a conflict state, the "send mission" command will override the conflict. Notably, the "send mission" command cannot be undone. The mission at this point will be completed by the strike units unless the user sends a new command to cancel. Activating the "send mission" button will de-activate all previous states described herein and allow the user to begin a new set of operations.

After the mission has been sent, various toolbar buttons will be activated. For example, a user can assign various control methods or directions to a strike asset, such as directions to fire an adjusting round, fire at the user's command, fire for effect, and to fire when ready. See FIGS. 12A-12D and FIGS. 14A-14B. Activated buttons on the toolbar can include the "abort" and "check fire" buttons. The abort button will terminate or cancel the mission. The "check fire" button will temporarily suspend firing operations. As shown in FIG. 5, the association lines for the firing solution will indicate that the mission as displayed has been sent to the proper strike units.

Figure 13A:
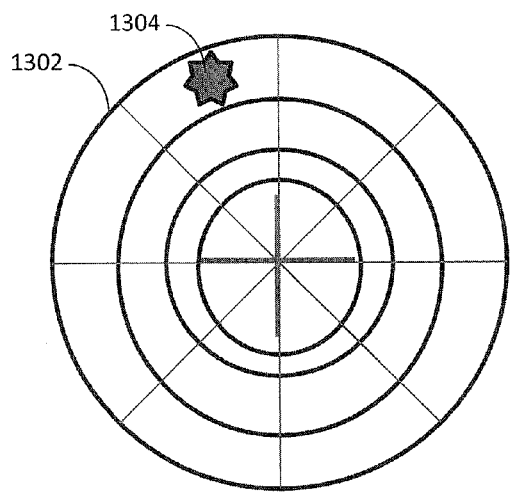
FIG. 13A-13B show two possible graphics for coordinating adjusting rounds.
Figure 13B:
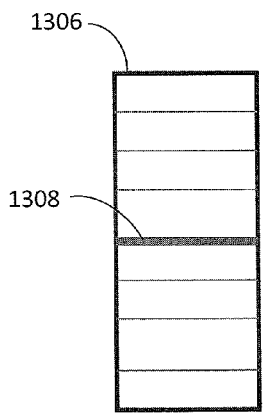
Figure 14A:
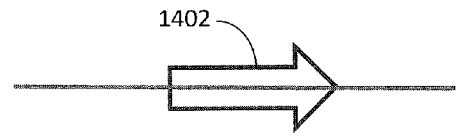
FIG. 14A-14E show association lines in combination with various alternative graphical elements used during a fire control execution stage to communicate information to a user.
Figure 14B:
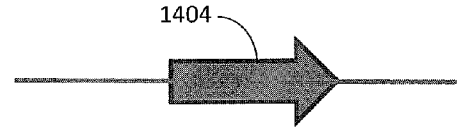
Figure 14C:
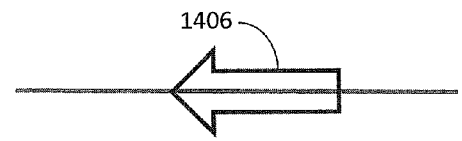
Figure 14D:
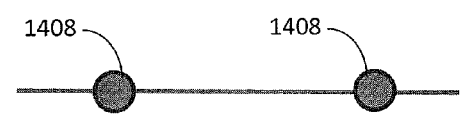
Figure 14E:

If the target control was designated to fire an adjusting round, the "adjust" button will be activated in the toolbar 101. Thereafter, when the adjust button is selected by a user, an adjust graphic can be presented or displayed to the user. Example of an adjust graphic 1302 is shown in FIG. 13A. In some embodiments, the adjust graphic 1302 can be displayed as an overlay centered on the location of the target 700, but the invention is not limited in this regard. The adjust display allows a user to communicate information to a strike unit regarding the actual observed placement of rounds in the vicinity of the target. Such information can be used by the strike unit to adjust equipment and thereby place the rounds more directly on target. Each ring in graphic 1302 provides a reference distance to the target. The user selects where the round landed by clicking within the graphic. The system responds by marking the adjustment location with graphic element 1304, automatically calculating the proper correction, and enabling the "send adjustment" button. Thereafter, the user can click on the "send adjustment" button to automatically communicate the adjustment to the appropriate strike unit. Any click on the display screen outside the adjust graphic removes the previously identified adjustment location, and disables the "send adjustment" button. Once the adjustment location has been marked in this way, the user can press the Fire For Effect button on the toolbar, or perform another adjusting round. In some instances, a vertical adjustment of round placement may be required, in which case the graphic element in FIG. 13B can be used.

Figure 6:
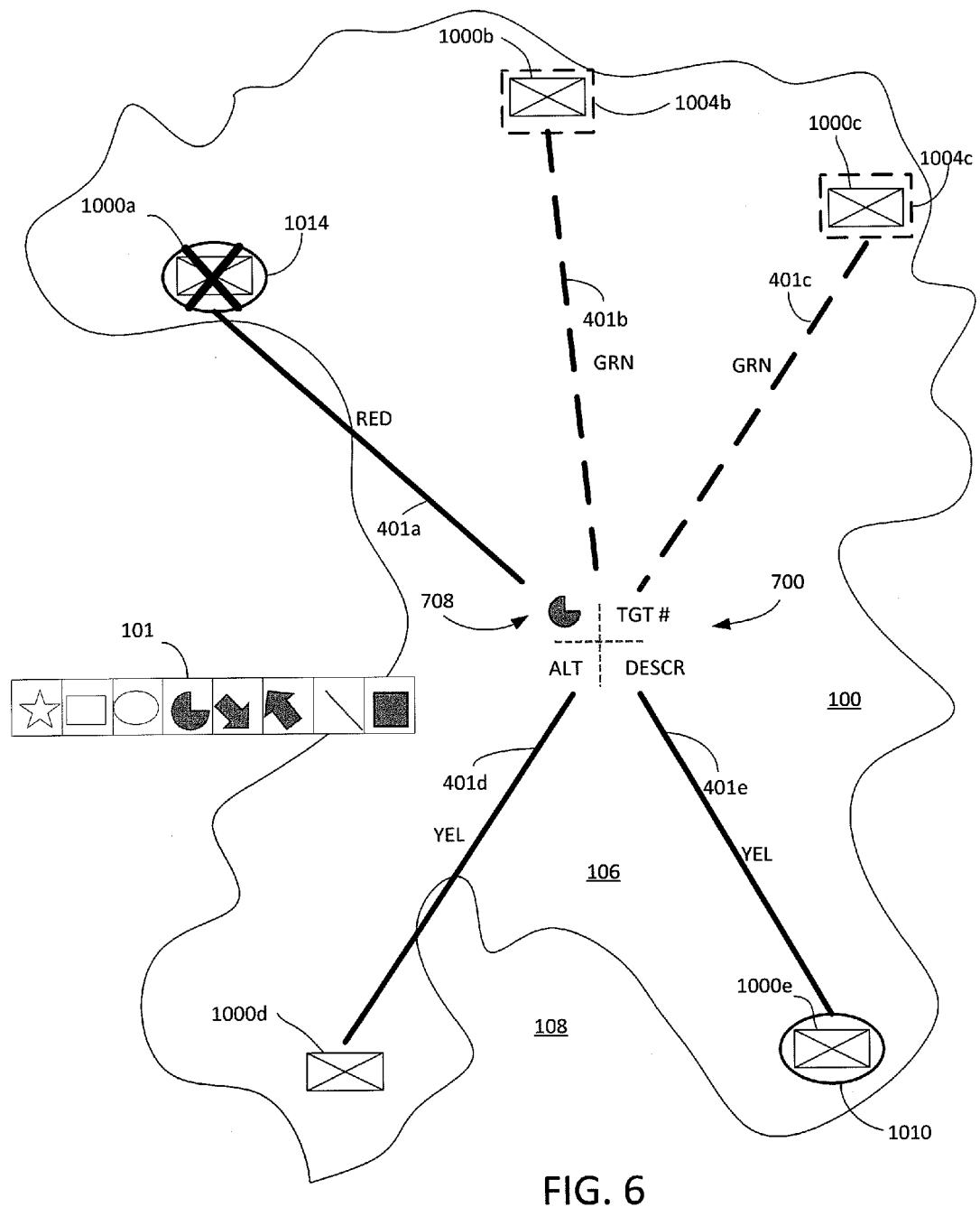
FIG. 6 shows the graphical display of FIG. 5 in which battle damage assessment is shown for the target.
Figure 15A:
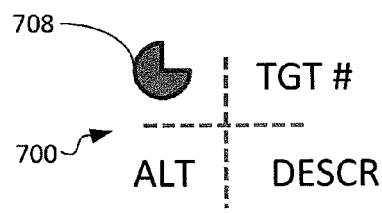
FIG. 15A-15H show various different graphical elements that can be displayed in conjunction with a target icon to indicate a battle damage assessment.
Figure 15B:
Figure 15C:
Figure 15D:
Figure 15E:
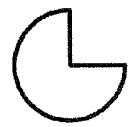
Figure 15F:
Figure 15G:
Figure 15H:
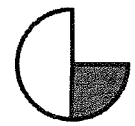

After the mission is completed, the actual effects upon the target can be graphically communicated to the user. In a preferred embodiment, the battle damage assessment (BDA) buttons in the toolbar will become active after all designated strike units have completed their assigned mission, and have clicked on a "rounds completed" button. The battle damage assessment buttons can include various buttons to allow the user to indicate the results of the fire mission. For example, separate BDA buttons can be provided to indicate that the target was suppressed, neutralized, or destroyed. Thereafter, the user can click on a "send BDA" button which communicates the BDA to other users on the system, and updates the system display to include an appropriate BDA graphic. For example, as shown in FIG. 6, the target icon can be modified to add a graphical element 708 which serves as a battle damage assessment indicator. A variety of different battle damage assessments are available using different graphic elements as shown in FIG. 15A-15H, where each graphic element has a defined meaning as shown. For example, FIGS. 15B-15D can indicate desired effect for missions that were met (successful). The graphics in FIGS. 15E-15H indicate that a mission was not met. The outline of the graphic in each case is filled in to an extent to show the actual results achieved. For example, FIG. 15H shows the case where a mission was to destroy, but the effect actually achieved was merely suppression.

The user can press an "end of mission" button at any time. Prior to sending the mission to the strike units, activation of the "end of mission" button will have the effect of clearing all mission states and removing any assignments. After sending the mission to the strike units, but prior to completion of the mission, it will generate a "check fire" message. After all rounds are complete, activating the "end of mission" button will end the mission. The user can press an "abort" button at any time. This action will immediately send a check fire notification to the strike units under circumstances where the mission has already been sent but the system has not been notified that all rounds have been fired.

Figure 7A:
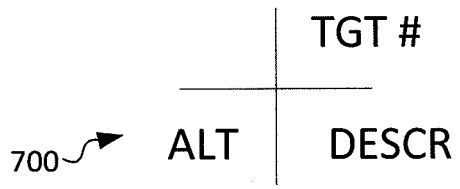
FIGS. 7A-7F show a target icon with a plurality of different graphical elements to communicate different status conditions to a user.
Figure 7B:
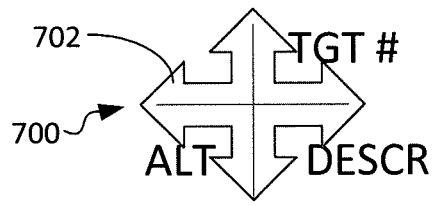
Figure 7C:
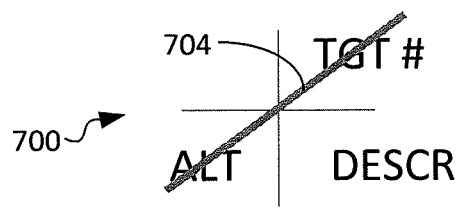
Figure 7D:
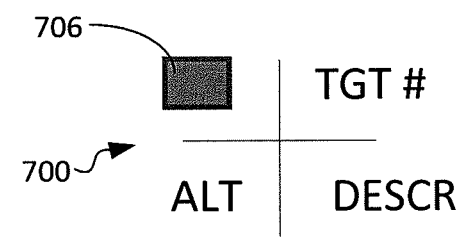
Figure 7E:
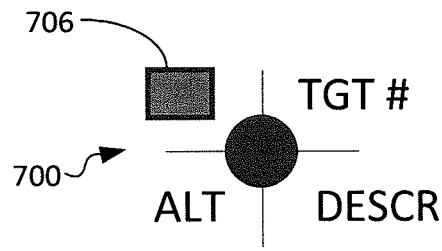
Figure 7F:
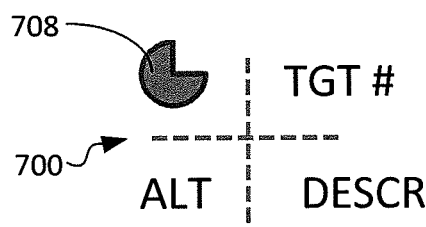

Certain icons used in the inventive arrangements, and their associated meaning, will now be described in further detail. Referring now to FIGS. 7A-7F there are shown various exemplary graphic elements that can be displayed with a target icon 700 to communicate different status conditions to a user. FIG. 7A shows a target icon 700 as a standard 2525b target representation. FIG. 7B shows the target icon 700 with a graphical element 702 added to indicate a user selection of that target, and assigning all actions (e.g. button selection) to the selected target object. In FIG. 7C, the standard target icon 700 is shown with a graphic element 704 added to indicate that the target is in a conflicted state due to rules of engagement, such as may occur when the target is within a no-fire-area (NFA). In FIG. 7D, the standard target icon is shown with a graphic element 706 added to specify a desired effect upon the target. In FIG. 7E, the standard target icon 700 is shown with an additional graphic element in the center of the target icon to indicate that the target has been assigned enough assets to meet the desired effect. The icon in FIG. 7E thus indicates that the mission can now be executed. In FIG. 7F, the standard target icon 700 is shown with a graphic element 708 added to specify a battle damage assessment.

Figure 9A:
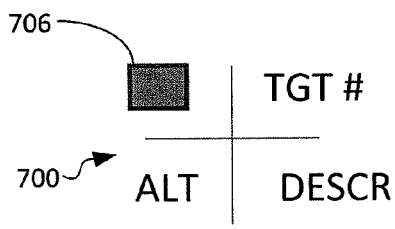
FIGS. 9A-9C show various graphic elements which can be displayed with a target icon in various different states of mission planning, execution, and evaluation.
Figure 9B:
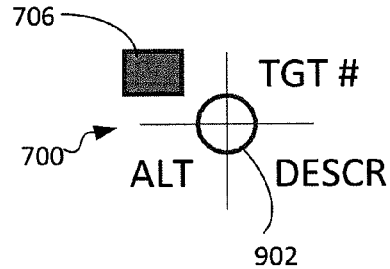
Figure 9C:
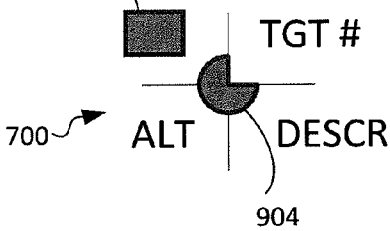
Figure 8:
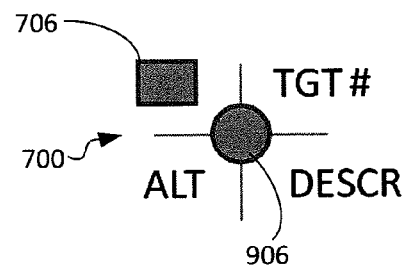

Referring now to FIGS. 9A-9C there are shown several exemplary graphic elements which can be displayed with a target icon 700 in different states of mission planning, execution, and evaluation. In FIG. 9A the target icon 700 with desired effect representation (graphic element 706) is shown in the planned state. In FIG. 9B, graphic element 902 is added to specify an "in progress" state which occurs when certain assets are selected and associated with the target. In FIG. 9C, two exemplary target icons 700 are shown, one having a graphic element 904, and a second having a 906 can indicate the percentage of asset assignments versus the desired effect. When enough assets have been associated with the target, the circle in the center of the target icon (graphic element 906) will be solid as shown.

Figure 10A:
FIGS. 10A-10H show various a strike asset icon displayed with various alternative graphic elements.
Figure 10B:
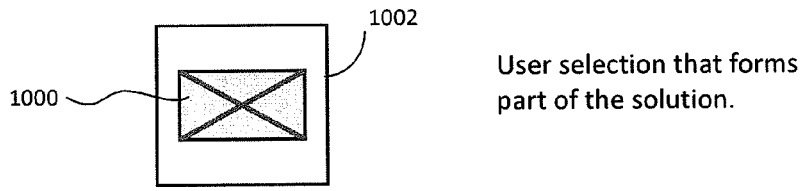
Figure 10C:
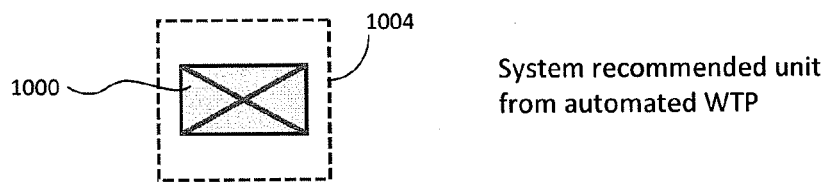
Figure 10D:
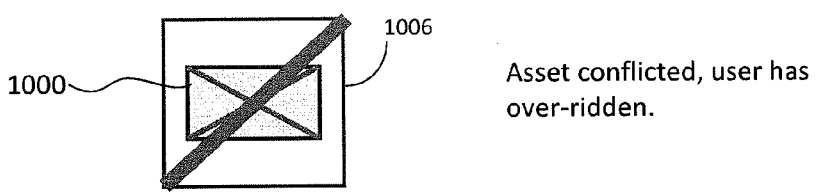
Figure 10E:
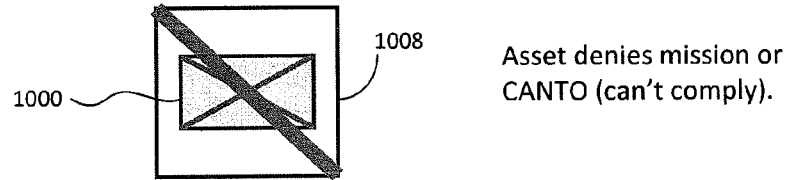
Figure 10F:
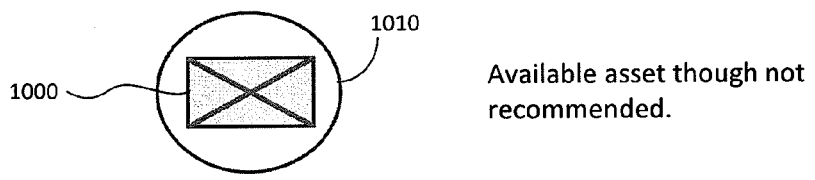
Figure 10G:
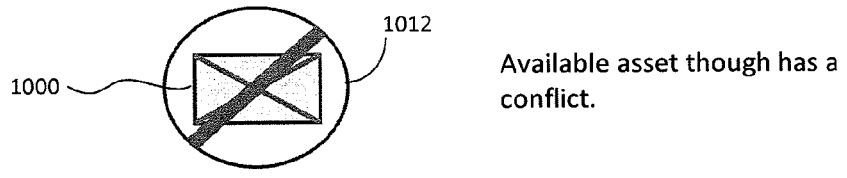
Figure 10H:
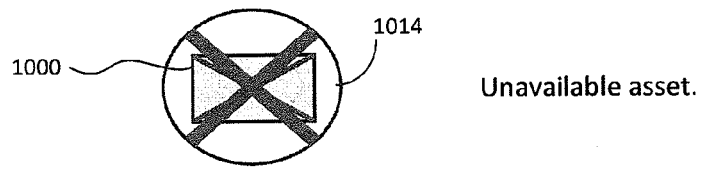
Figure 11A:
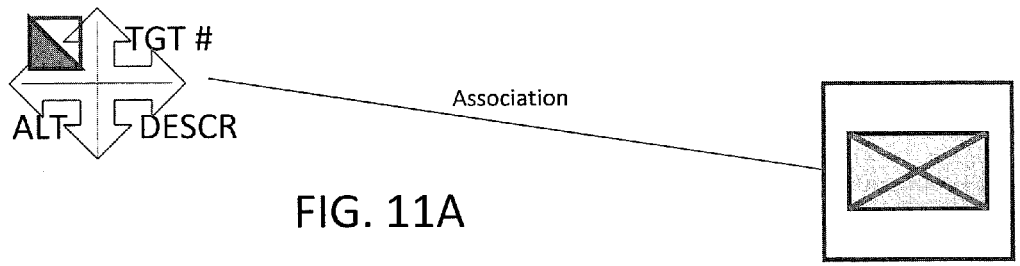

Referring now to FIGS. 10A-10H, there is shown a strike asset icon displayed with various alternative graphic elements. The basic icon used to represent a strike asset 1000 (sometimes referred to as a fire support unit) is shown in FIG. 10A. In FIG. 10B the strike asset icon 1000 is shown with a graphic element 1002 used to indicate that the strike asset is a user selection that forms part of the fire solution. In FIG. 10C the strike asset icon 1000 is shown with a graphic element 1004, which indicates that the strike asset is system recommended based on an automated WTP process. In FIG. 10D the strike asset icon 1000 is shown with a graphic element 1006, which indicates a user selected strike asset that is conflicted, where the user has over-ridden the conflict. In FIG. 10E the strike asset icon 1000 is shown with a graphic element 1008, which indicates that the strike asset has denied the mission or cannot comply with the requested mission. In FIG. 10F the strike asset icon 1000 is shown with a graphic element 1010, which indicates that the strike asset is available, though not recommended by an automated WTP process. In FIG. 10G the strike asset icon 1000 is shown with a graphic element 1012, which indicates a that the strike asset is available, but has a conflict. In FIG. 10H the strike asset icon 1000 is shown with a graphic element 1014, which indicates a user selected strike asset that is unavailable.

The present invention can be realized in one computer system. Alternatively, the present invention can be realized in several interconnected computer systems. Any kind of computer system or other apparatus adapted for carrying out the methods described herein is suited. A typical combination of hardware and software for each user computer can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 16:
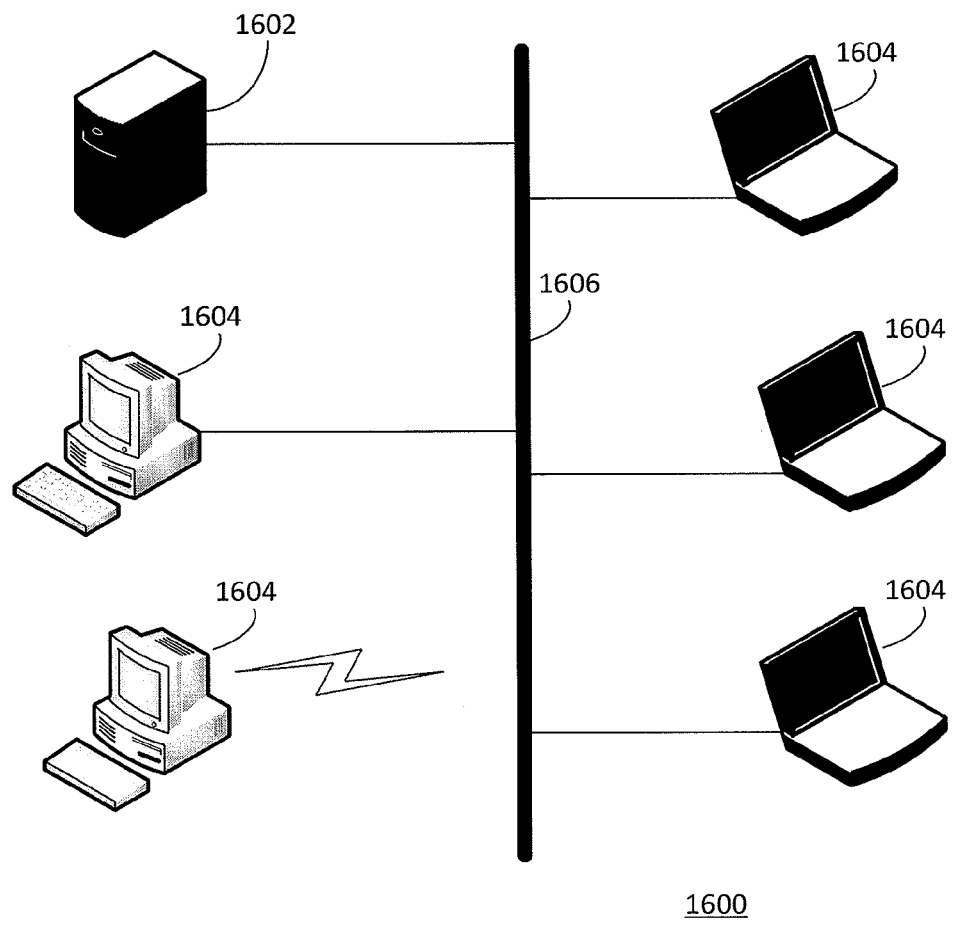
FIG. 16 is an example of a computer system that can be used to implement the present invention.

A computer system in accordance with the present invention can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. For example, FIG. 16 shows an interconnected computer system comprising a plurality of separate user computers 1604 which are connected to a server 1602 by means of a computer network 1606. The network connection can be wired, wireless, or a combination of the two. The software for carrying out the various functions described herein can be disposed on the server 1602, the user computers 1604, or a combination of the two Likewise, data stores necessary to support the various operations described herein can be provided on server 1602, one or more user computers 1604, or on a combination of these. The phrase "computer system" shall be understood to include any collection of computing devices that individually or jointly execute a set (or multiple sets) of instructions to perform any one or more of the methodologies discussed herein.

Figure 17:
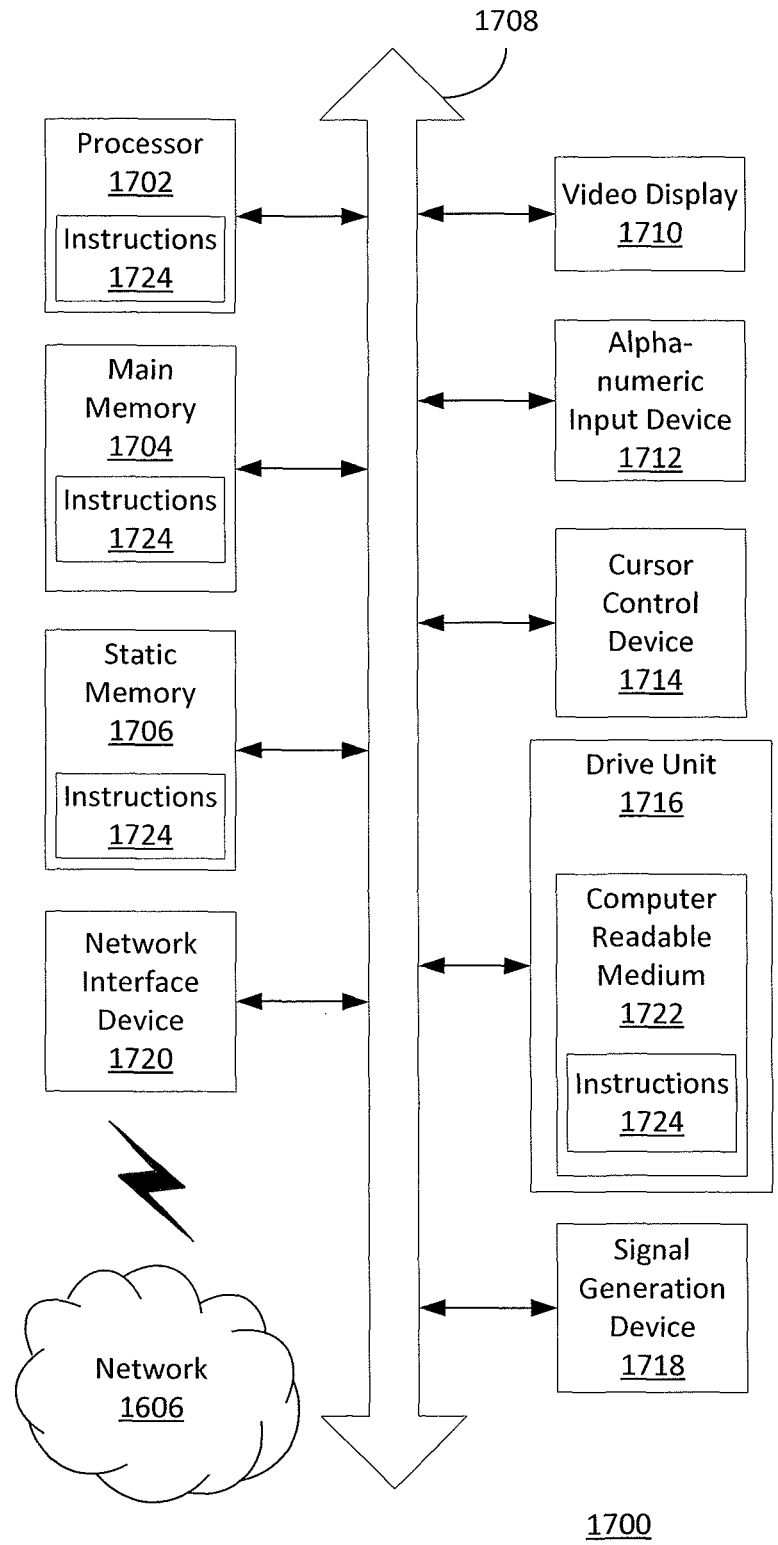
FIG. 17 is an example of a general purpose computer that can be used for implementing the computer system in FIG. 16.
Figure 18:
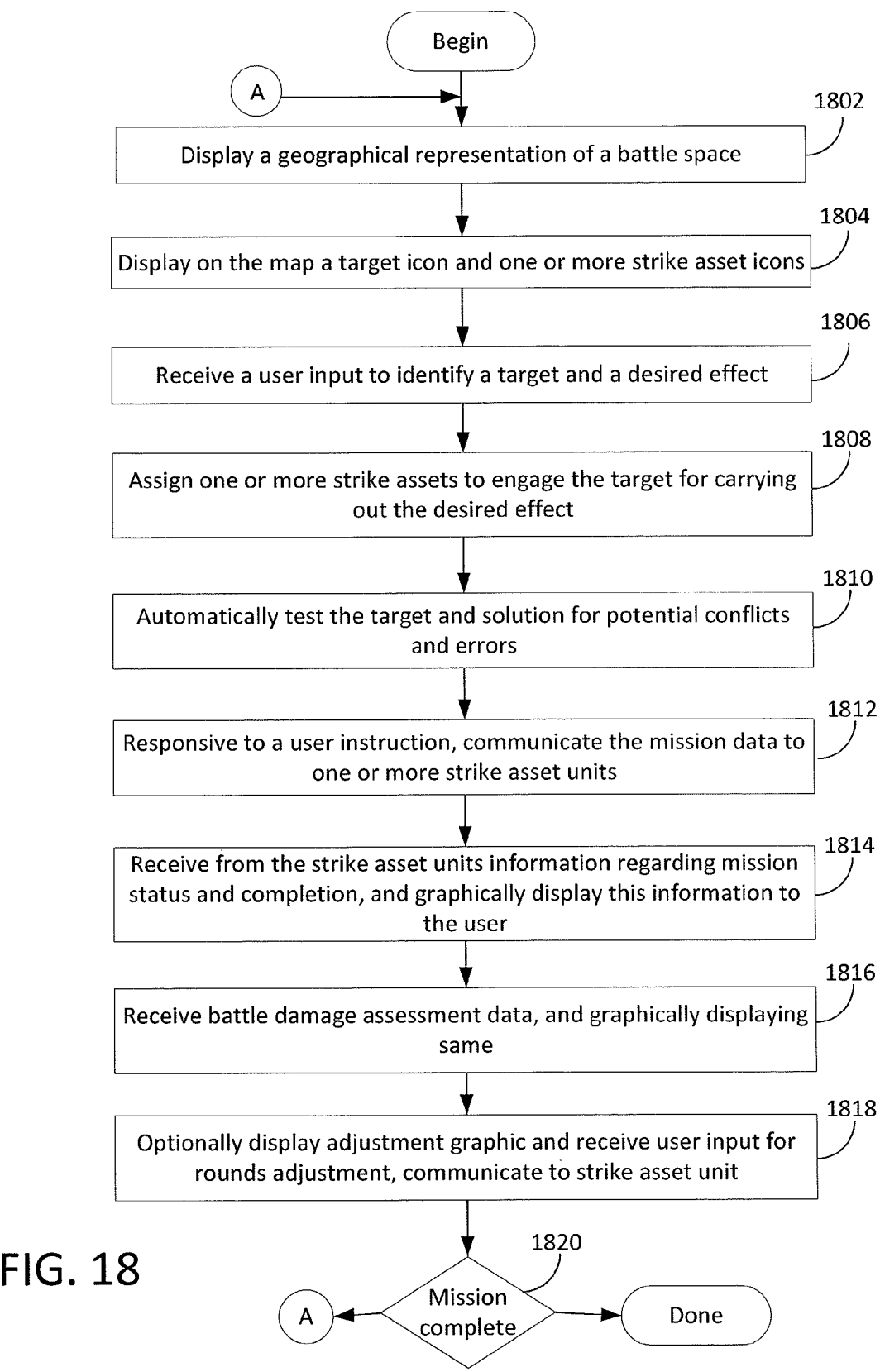
FIG. 18 is a flowchart that is useful for understanding the present invention.

A server computer 1602 and/or a client user computer 1604 can be arranged as shown with regard to FIG. 17 which shows a general purpose computer. The general purpose computer 1700 includes a processor 1702 (such as a central processing unit (CPU), a graphics processing unit (GPU, or both), a main memory 1704 and a static memory 1706, which communicate with each other via a bus 1708. The computer system 1700 can further include a display unit 1710, such as a video display (e.g., a liquid crystal display or LCD), a flat panel, a solid state display, or a cathode ray tube (CRT)). The computer system 1700 can include an input device 1712 (e.g., a keyboard), a cursor control device 1714 (e.g., a mouse), a disk drive unit 1716, a signal generation device 1718 (e.g., a speaker or remote control) and a network interface device 1720.

The disk drive unit 1716 includes a computer-readable storage medium 1722 on which is stored one or more sets of instructions 1724 (e.g., software code) configured to implement one or more of the methodologies, procedures, or functions described herein. The instructions 1724 can also reside, completely or at least partially, within the main memory 1704, the static memory 1706, and/or within the processor 1702 during execution thereof by the computer system 1700. The main memory 1704 and the processor 1702 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described above are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

In the various embodiments of the present invention a network interface device 1720 connected to a network environment 1726 communicates over the network 1726 using the instructions 1724. The instructions 1724 can further be transmitted or received over a network 1726 via the network interface device 1720.

While the computer-readable storage medium 1722 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Those skilled in the art will appreciate that the computer system architecture illustrated in FIG. 17 is one possible example of a general purpose computer that can be used to implement the computer system 1600 described herein. However, the invention is not limited in this regard and any other suitable computer system architecture can also be used without limitation.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

I claim:

1. A method of providing fire support command and control for small unit operations, comprising:
    displaying on a graphical user interface of a computer system a geographical representation of a battle space using a map;
    displaying on said map one or more strike asset icons representing strike assets which are geographically dispersed within said battle space;
    displaying on said map at least one target icon representing a target within said battle space that has been selected based on a user input to said computer system;
    receiving at said computer system a user input selectively identifying one of a plurality of desired effects upon said target, said desired effect specifying a target state to be achieved at the completion of a mission;
    in a planning process involving at least one user input to said computer system, defining a fire solution by assigning one or more of said strike assets capable of engaging the target for carrying out the desired effect; and
    graphically conveying fire mission planning information to said user on said graphical user interface during said planning process by selectively displaying one or more graphic elements, each having a predetermined meaning, in combination with said target icon, said fire planning information including at least one graphic element displayed on said map to selectively indicate which of said desired effects has been specified by said user input, which of said strike assets have been assigned to said target, and a relative portion of said desired effect which will be achieved based on the assigning of said one or more said strike assets.

2. The method according to claim 1, further comprising automatically determining if the fire solution will result in any conflicts or errors.

3. The method according to claim 1, further comprising, receiving a user input at said computer system specifying a number of shots to be fired by each said strike asset, and wherein said relative portion of said desired effect which will be achieved is determined based on the number of shots specified.

4. The method according to claim 1, further comprising selectively displaying on said map at least one graphic icon comprising a battle damage assessment report for said target, said graphic icon specifying a relative portion of said desired effect which was achieved as a result of said assigned mission.

5. The method according to claim 1, wherein said predetermined meaning is that said target is in a conflicted state.

6. The method according to claim 1, wherein said predetermined meaning is a command and control information directed to a strike asset.

7. The method according to claim 6, wherein said command and control information is selected from the group consisting of a request for an adjusting round, an order to begin firing upon command, an order to fire when ready, an order to fire for effect, and an order to check fire.

8. The method according to claim 1, further comprising automatically displaying at least one of a plurality of different predetermined graphic elements in combination with at least one said strike asset icons to respectively communicate to said user at least one of a plurality of predefined strike asset information existing with respect to a particular strike asset.

9. The method according to claim 8, wherein said plurality of predefined strike asset information includes that said strike asset that forms part of the fire solution, said strike asset is conflicted or cannot comply with an assigned mission, said strike asset that is available but not recommended, said strike asset that is available but has a conflict, and said strike asset is unavailable.

10. The method according to claim 1, further comprising automatically displaying an association line extending between said strike asset icon and said target icon using at least one of a plurality of different graphical line styles to respectively communicate one of a plurality of different predefined fire control information.

11. The method according to claim 10, wherein said predefined fire control information specifies at least one fire condition selected from the group consisting of a direct fire with line of sight, a direct fire without computed line of sight, indirect fire and status is capable of firing.

12. The method according to claim 10, wherein said predefined fire control information specifies a strike asset action selected from the group consisting of a direct double basic shot, direct triple basic shot, indirect double basic shot, indirect triple basic shot.

13. The method according to claim 10, further comprising automatically displaying said graphical line style in one of a plurality of predetermined colors.

14. The method according to claim 13 wherein said color indicates at least one of a system recommendation regarding the suitability of a strike asset for weapons pairing with respect to said target, and a readiness state of said strike asset.

15. The method according to claim 10, further comprising automatically displaying in alignment with said association line at least one of a plurality of different graphical symbols indicating at least one of a plurality of predefined mission assignment status conditions.

16. The method according to claim 15, wherein said predefined mission status conditions are selected from the group consisting of a mission sent to a strike asset to fire at a user's command, a mission sent to a strike asset to fire for effect, a strike asset that is ready and waiting for a fire command, and an estimated position of munitions inbound upon a target, and a denial or inability of a strike asset to comply with an assigned mission.

17. The method according to claim 1, further comprising determining a target selected for a fire mission in response to detection of a cursor positioned on said target icon concurrently in combination with detecting a signal produced by an activation of a user input control switch.

18. The method according to claim 1, wherein said defining step further comprises automatically identifying a fire solution including one or more selected strike assets capable of achieving a user specified effect upon said target.

19. A method of providing fire support command and control for small unit operations, comprising:
   displaying on a graphical user interface of a computer system a geographical representation of a battle space using a map;
   displaying on said map one or more strike asset icons representing strike assets which are geographically dispersed within said battle space;
   displaying on said map at least one target icon representing a target within said battle space that has been selected based on a user input to said computer system;
   receiving at said computer system a user input selectively identifying one of a plurality of desired effects upon said target, said desired effect specifying a target state to be achieved at the completion of a mission;
   graphically conveying fire mission planning information to said user on said graphical user interface during a mission planning process by selectively displaying one or more graphic elements, each having a predetermined meaning, in combination with at least one said target icon, said one or more graphic elements displayed on said map arranged to selectively indicate which of said desired effects has been specified by said user input, which of said strike assets have been assigned to said target, and a relative portion of said desired effect which will be achieved based on the assigning of said one or more said strike assets; and;
   automatically determining if a proposed fire solution will result in any conflicts or errors; and
   in response to a user command, automatically communicating to said assigned strike assets mission data for implementing said fire mission.

20. The method according to claim 19, wherein said graphically conveying step further comprises selectively displaying said one or more graphic elements in combination with at least one said strike asset icon.

21. The method according to claim 19, further comprising conveying mission planning information to said user during said mission planning process by selectively displaying one of a plurality of line styles for an association line extending between a target icon and said strike asset icon.

22. The method according to claim 19, further comprising subsequent to said communicating step, graphically conveying a status of at least one strike asset to said user by selectively displaying one or more graphic elements, each having a predetermined meaning, in combination with said strike asset icon.

23. The method according to claim 19, further comprising graphically conveying a battle damage assessment to said user during or after said fire mission by selectively displaying one or more graphic elements, each having a predetermined meaning, in combination with said target icon.

* * * * *